Sept. 15, 1931.   G. M. WHITNEY   1,823,306
AUTOMATIC PRECISION BALANCE
Filed April 1, 1930   2 Sheets-Sheet 1
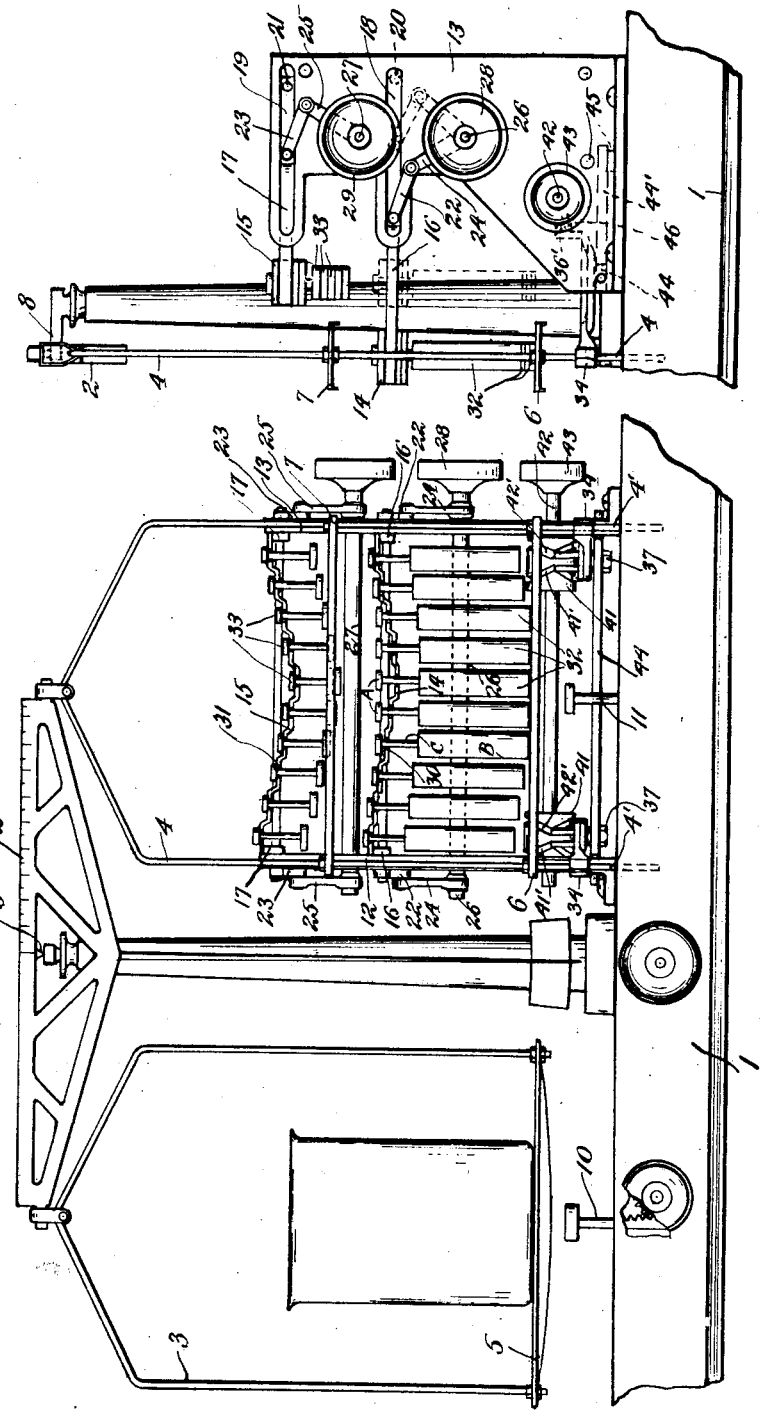

Sept. 15, 1931.   G. M. WHITNEY   1,823,306
AUTOMATIC PRECISION BALANCE
Filed April 1, 1930   2 Sheets-Sheet 2
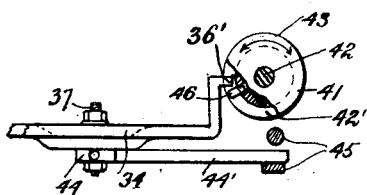
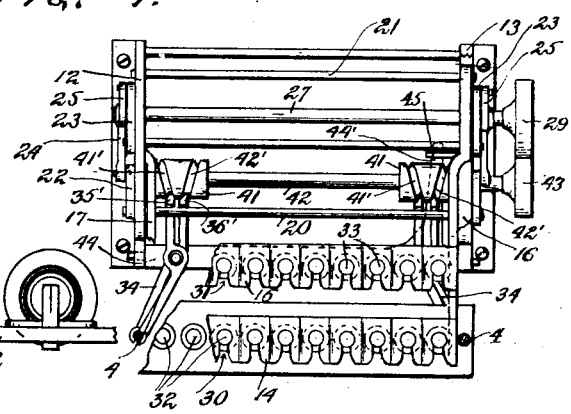
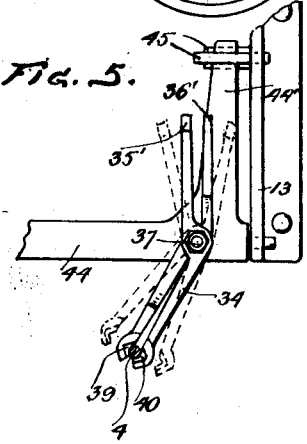
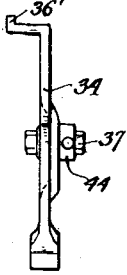
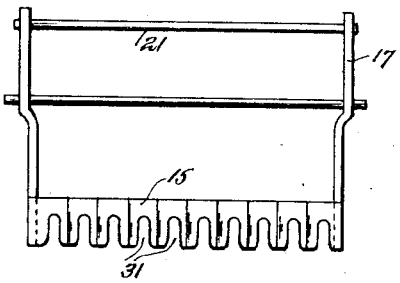
INVENTOR:
GARY M. WHITNEY,
ATTY.

Patented Sept. 15, 1931

1,823,306

UNITED STATES PATENT OFFICE

GARY M. WHITNEY, OF WILMINGTON, CALIFORNIA

AUTOMATIC PRECISION BALANCE

Application filed April 1, 1930. Serial No. 440,759.

My invention relates to an instrument for weighing and it has particular reference to a balance of precision adapted to very accurate work.

The objects of the invention are essentially to provide a balance in which one scale thereof automatically selects the weights or series of groups of weights that are required to balance the object to be weighed; to provide a balance in which the number of motions heretofore necessary for ascertaining the weight of an object is reduced to a practical minimum; to provide a balance in the use of which the effects of frequently opening the case are eliminated; to provide a balance in which the element of approximate predetermination or pre-estimate, of the possible weight of an object is wholly eliminated; to provide a balance that may be readily used by the highly skilled as well as by the average analyst, and to provide an instrument by which the weighing of an article, object or substance may be accomplished in considerably less time than by the ordinary precision balance, with an increased accuracy, due to using weights always in the same sequence.

These and other objects are attained by an apparatus expressed in preferable form in the accompanying drawings, which compose a part of this application, and more specifically detailed in the specification following.

In the drawings

Fig. 1 is a front elevation of a balance embodying my invention.

Fig. 2 is a side view.

Fig. 3 is a fragmentary detail of means for imparting vertical motion to the stirrup.

Fig. 4 is a fragmentary plan view.

Fig. 5 is a plan detail of a gripping device for the scale stirrup.

Fig. 6 is a side view of same, and

Fig. 7 is a plan detail of one of the weight carriers.

The invention relates to a precision balance per se as well as to an appurtenance or adjunctive unit by which the ordinary precision balance may be rendered practically automatic in its operation of weighing and since the adaptation of the adjunct to the ordinary balance requires only slight or minor modifications of the same, mechanical features and details of the analytical balance, which remain unchanged in their relative operations, will be but cursorily referred to hereinafter.

In a broad sense, the invention consists of a plurality of series of weights of given denomination sustained in suitable carriers and so disposed with respect to the scale on which they are to be used as to reduce the operation of weighing from the time-consuming and laborious one of "trial and error" commonly in use, to a simple, automatic one in which the object, the weight of which is to be determined, weighs itself.

Referring in particular detail to the drawings, a preferred form of embodiment of the invention is represented in connection with an ordinary analytical balance, which, except for minor changes presently pointed out, combines the ordinary mechanical features of such a balance, namely a base 1, and a beam 2, which is graduated and upon which a rider, or other device, not shown, may be used in the final adjustment of each weighing where very accurate determinations are required; stirrups 3 and 4; scale pans 5 and 6 and 7, attached to the respective stirrups 3 and 4; knife edge pivot 8 and other structural details which are well known and need no especial mention. It will be noted that the stirrup 4, supports a plurality of flat pans or trays 6 and 7, in superposed relation, the aggregate weight of such pans being equal to the weight of the pan 5, and that the ends 4', of the stirrup 4 are shown projecting or extending beyond the bottom of the lower pan 6. It will also be noted that the base is provided with an adjustable stop 10, that is arranged for engagement with the pan 5 to elevate same; and with a stop 11 which may also be adjustable to limit the downward movement of the scale pans 6 and 7, for purposes to appear later.

The present invention is adapted to a balance modified in the respects detailed and comprises a pair of upstanding spaced plates 12 and 13 which are secured to the base 1 of the balance in any rigid manner, and which constitute substantially a frame. A plurality of carriers 14 and 15 are mounted in or upon the frame for relative sliding movement, the details of the structural arrangement of the slidable carriers being illustrated in Figs. 2, 4 and 7 as a convenient means by which the movement of the carriers may be effected, and comprising spaced slides 16 and 17 disposed in transverse ways, guides or slots 18 and 19 in the frame plates 12 and 13. The respective slides 16 and 17 are conjoined by tie rods 20 and 21, and at the front the slides 16 and 17 support the aforementioned carriers 14 and 15. As stated, the carriers are arranged for reciprocation in, and relatively to, the frame plates 12 and 13 and a means for producing such reciprocation is shown more particularly in Fig. 2. To the slides 16 and 17 supporting the carriers 14 and 15 respectively, are pivotally connected links 22 and 23 which are pivotally attached to arms 24 and 25, rigidly mounted upon horizontal shafts 26 and 27 which extend through and between the spaced frame plates 12 and 13. The shafts 26 and 27 project beyond one side of the frame plates, to wit 13, as shown in Figs. 1 and 4 and upon the ends thereof are mounted hand or thumb wheels 28 and 29, by the manipulation of which the carriers 14 and 15 are moved to and fro relatively to the frame, as required in the operation of weighing, and as explained later.

The respective carriers 14 and 15 are preferably fashioned or arranged in a series of steps, as shown in Fig. 1, and the steps are indented as shown at 30 and 31. These carriers are arranged to suspend a plurality of series of weights 32 and 33, the weights in each series being of equal value, but the respective series of weights being of different values. Each weight is of the same structural design and consists of a head A, a body or base B and a neck C conjoining the head and body. The necks C of the weights fit loosely in the indentations 30 and 31 of the carriers and by the heads A, the weights are freely suspended from the carriers 14 and 15. The weights of each series being uniform in design and shape, it will be obvious that when freely suspended from the carriers 14 and 15, which as stated are stepped, they will also be stepped relatively to one another, so that the engagement of the weights by a rising pan will be in the sequence in which they are disposed on relatively different planes. As seen in Fig. 1, the approximately centrally located weight of each series will be lifted first and this is of advantage in reducing disturbance of the pan as each weight is sequentially engaged and lifted thereby, but it is not essential that this mode of disposition of the weights be strictly adhered to. By means of the wheels 28 and 29 the respective carriers 14 and 15 are arranged to be alternately moved so that the pendent weights 32 and 33 are brought into the path of deflection of the scale pans 6 and 7. The rising pans automatically select a number of the multiple unit weights 32, which are lifted vertically in and relatively to the carrier 14. When the weights thus selected approximate the weight of the object to be weighed, the carrier 14 is withdrawn, leaving the weights thus selected on the pan 6, if any, remaining suspended in the carrier 14. The carrier 15 is now moved forward so that the pendent weights 33 thereon are immediately above the pan 7, which during its upward movement selectively engages those of the weights in the carrier needed to complete the balancing of the object in the pan 5, assuming of course that the weights 32 have not balanced the object. Since the respective carriers with their pendent weights are independently movable it will be apparent that each series or group of weights is singly or combinatively adapted for use in weighing and it will be understood that the weights employed may represent fractions of the multiple or unit weights and that the number of pans used may be increased as desired. In this wise the balance may be rendered automatic and the use of the usual rider eliminated. Prior to any operation of the balance it is required that the pans 6 and 7 be held against movement and in such relation to the weights 32 and 33 that the forward movement of them shall be above and free of the pans. For this purpose provision is made first to lower pans 6 and 7, against stop 11, by elevating stop 10 and then to grip the ends 4' of the stirrup 4, which as previously noted, project or extend beyond the bottom of the lower pan 6, as seen in Fig. 1. The gripping means is shown in Figs. 1, 2 and 4 and in detail in Figs. 3, 5 and 6 and comprises preferably two pairs of tongs 34 each consisting of two members pivoted together at 37. The front ends of the tongs 34 are provided with suitable friction inserts or linings 39 and 40, and the rear ends of the members 35 and 36 forming the tongs are provided with lugs or studs 35' and 36', which are disposed in reverse cam grooves 41' and 42'; formed in a pair of wheels 41 that are rigidly connected with a shaft 42, journaled in the side plates 12 and 13, and one end of which is provided with a hand or thumb wheel 43 for rotating same. By the rotation of said shaft 42 and the cam wheels 41 thereon, the opening and closing of the tongs is effected, such action either leaving the stirrup end 4' free to respond to scale deflections or gripping the same to hold same against movement vertically when adjusting one weight carrier or the other into the range of movement of the scale pans. These tongs 34 are also useful in constraining or slightly braking the upward motion of the stirrup 4, so that too sudden an engagement of the pans with the weights shall be prevented.

They also serve to prevent a sidewise swinging of the stirrup and to arrest any vertical motion of the pans at any point desired. Additionally these tongs serve the important purpose of lowering the stirrup 4 and its pans 6 and 7 for that fractional distance required to remove the pan from the frictional pressure of a weight which the object to be weighed was unable to lift, thereby to enable one or the other of said carriers with the unused weights to be withdrawn while the used weights remain on one or the other or both pans. The tongs 34, are connected by their pivot pins 37 to a bar 44, Fig. 5, that is trunnioned in the side plates 12 and 13 in which said bar is oscillatable, the oscillatory motion of said bar being restricted or limited to a very small arc by a plurality of stop members 45 on the side plates, one of said stop members 45 being disposed above an extension 44' of said bar 44, and the other stop member being disposed below said extension 44'. The grooves 41' and 42' in the wheels or cylindrical bodies 41 terminate in or are provided with abutments 46, Fig. 3. As these wheels or cylindrical bodies 41 are turned, the tongs 34, the ends of which are disposed in said grooves, are operated to gripping position. When they have gripped the stirrup 4, the further or continued rotational movement of said wheels or cylindrical bodies 41 will cause the abutments 46 to contact with the ends of the tongs 34 and move them within a very small arc defined by the stop members 45. Assuming that the rotation of wheels 41 has occurred in a right direction (Fig. 2), it will be seen that the grip end of the tongs gripping the stirrup 4 will thus be moved downwardly, to a distance approximately of one-half the distance from step to step on the weight carriers. This downward movement of the tongs while gripping the stirrup 4 carries the pans away from contact with any weight which the object to be weighed failed to lift from the carrier and such weight, together with other weights still suspended in the carriers may then be withdrawn, leaving the weights actually lifted free of the carriers upon the pan or pans. It will be observed that the extent of the downward movement of the tongs and the pan or pans is not sufficient to cause a fully used weight to seat in the carriers, but is just sufficient to remove the pan or pans from contact with the particular weight which one or the other pan was unable to lift.

The aforementioned stop 10 is adjustable for the purpose of elevating the pan 5 with the object thereon, the weight of which is to be determined, whereby the companion pan 6 is lowered into engagement with the fixed stop 11, the position of both pans 6 and 7 then being below the bottom of the lowest pendent weights in the respective carriers 14 and 15, which can thus be advanced to within the range of upward deflection of the said pans.

When the scale is in this position, both weight carriers 14 and 15 being in normally withdrawn position, one or the other of said carriers is advanced so that the weights carried thereby are immediately over one or the other of said pans 6 and 7. The stop member 10 is now removed or lowered relatively to the pan 5 on which the object to be weighed is carried. During the ascent of the pans 6 and 7 one or the other of them will selectively lift a weight or some of them or all of them that are suspended in the particular carrier that has been advanced in a specific case. If the weight of the object lies between one unit and ten units, or fractions of units and multiples, this will be indicated by the lifting of one or more weights 33 from the carrier 15. If all of the weights on the units carrier 15 are lifted free, the weight of the object is greater than the ten units in the carrier 15, indicating that multiples are also required. In this event, the carrier 15 with its suspended weights, is withdrawn, and the carrier 14, with the multiple weights 32 is advanced. The object to be weighed will now lift as many of the multiple weights as it will, which if they balance the object, indicate the weight thereof. If they fail to balance the object by a fraction, the carrier 14 is withdrawn leaving on the scale pan 6, the multiple weights. The carrier 15 with the unit weights 33 is thereupon advanced in manner described, and the deflection of the scale pan 7, due to the object, will lift the weights needed to balance the same. If all the unit weights and multiple weights lift, then the weight of the object is beyond the capacity of the balance.

Thus with two simple sets of motions, the weight of an object may be accurately determined.

What I claim is:

1. An automatic balance of the character disclosed comprising, in combination with the scale pans thereof, a series of weights of equal value, supports in which said weights are loosely and detachably carried, and means to move said supports selectively with respect to one of said pans so that upon the upward movement of said scale pan the weights carried by said supports shall be selectively engaged, said supports being withdrawable out of the path of movement of the scale pan and free of the weights selectively engaged by said pan.

2. Means for rendering automatic the weighing of an object comprising, in combination with a precision balance, a plurality of series of weights, the weights in each series being of equal value, movable carriers in which said weights are freely and disconnectedly suspended, and means to operate said carriers, at one time, to move same to within the zone of movement of one of the scale pans of said balance, whereby upon the upward movement thereof by the object to be weighed said pan selects the weights required, and at another time, to withdraw said carrier to leave the weights selected upon the balance pan and remove the remainder.

3. In a device of the character disclosed, in combination with a precision balance one of the stirrups of which is provided with a plurality of scale pans or trays, a plurality of carriers, a plurality of series of weights freely and disconnectedly suspended in said carriers, each series being of different value, and means to advance said carriers to within the zone of movement of said scale pans or trays whereby said pans or trays select the weights required, and to withdraw said carriers to leave the weights selected upon said pans.

4. In a device of the character described, the combination with a precision balance including a plurality of pans or trays on one of the stirrups thereof, of a plurality of carriers, a plurality of series of weights freely and detachably suspended in each of said carriers, means to move said carriers to within the zone of upward deflection of said pans or trays whereby said pans or trays select the weights required to balance an object to be weighed and to withdraw said carriers to leave the selected weights upon the pans or trays, and means to lock the scale pans in a position below the weights during the movement of the respective carriers.

5. In a device of the character disclosed, the combination with a precision balance and a plurality of pans or trays carried by one of the stirrups thereof, of different valued series of weights, and means for shifting said weights to within the zone of upward deflection of said scale pans or trays for selection by them of the weights required.

6. In a device of the character disclosed the combination with a precision balance and a plurality of pans or trays carried by one of the stirrups thereof, of a plurality of series of weights arranged in stepped relation, the weights in each series being of equal value, and means for shifting said weights to within the zone of upward deflection of said scale pans or trays for selection by them of the weights required to balance an object to be weighed.

7. In a device of the character disclosed, the combination with a precision balance and the pans appurtenant thereto, of a series of weights, and means to shift said weights into the zone of upward deflection of one of said scale pans for a selection by it of the weight or weights required to balance an object and means for locking the balance against movement during the shifting of said weights.

8. In a device of the character disclosed, the combination with a precision balance including the stirrups, and a series of pans or trays carried by one of the stirrups, of a plurality of series of weights, the weights in each series being of equal value, and means for shifting the respective series of weights into the zone of upward deflection of said pans or trays for selection by them or either of them of the weights required to balance an object.

9. In a device of the character disclosed, the combination with a balance including a plurality of pans or trays that normally balance the opposing pan, of a plurality of series of weights, means for selectively moving the series of weights into the zone of upward deflection of said pans or trays for automatic selection by one or all of them of the weights required to balance an object carried by the opposing pan.

10. In a device of the character disclosed, the combination with a balance including the scale pans thereof, of a series of weights, of supports for said weights and means to shift said supports to bring the weights thereon into the zone of upward deflection of one of said pans for selection by it of the weights required to balance an object.

11. In a device of the character disclosed the combination with a balance and the pans thereof, of a carrier, a plurality of weights freely and disconnectedly suspended in said carrier and disposed in stepped relation, means to move said carrier to within the zone of upward deflection of one of said pans, and means to hold said balance against movement during the movement of said carrier and to release said pan to enable the same, by the deflection caused by the object to be weighed, to select the weight or weights required to balance the object.

In testimony whereof I have set my hand.

GARY M. WHITNEY.